(12) United States Patent
Dent

(10) Patent No.: US 6,311,171 B1
(45) Date of Patent: *Oct. 30, 2001

(54) SYMMETRICALLY-SECURED ELECTRONIC COMMUNICATION SYSTEM

(75) Inventor: Paul W. Dent, Pittsboro, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,498

(22) Filed: Jul. 11, 1997

(51) Int. Cl.⁷ .................................................. G06F 17/60
(52) U.S. Cl. ........................................................ 705/64
(58) Field of Search ................... 705/37, 44, 64, 705/69, 66; 380/23, 24, 30; 235/379, 380

(56) References Cited

U.S. PATENT DOCUMENTS

| | | | |
|---|---|---|---|
| 5,101,353 | 3/1992 | Lupien et al. ........................ | 705/37 |
| 5,297,031 | 3/1994 | Gutterman et al. .................. | 705/37 |
| 5,297,032 | 3/1994 | Trojan et al. ........................ | 705/37 |
| 5,305,200 | 4/1994 | Hartheimer et al. ................ | 705/37 |
| 5,347,580 * | 9/1994 | Basso, Jr. et al. .................. | 706/23 |
| 5,375,055 | 12/1994 | Togher et al. ...................... | 705/37 |
| 5,442,706 * | 8/1995 | Kung .................................. | 380/30 |
| 5,621,797 | 4/1997 | Rosen ................................. | 105/76 |
| 5,633,930 * | 5/1997 | Davis et al. . | |
| 5,719,918 * | 2/1998 | Serbetcioglu et al. . | |
| 5,748,740 * | 5/1998 | Curry et al. . | |
| 5,805,702 * | 9/1998 | Curry et al. . | |
| 5,839,119 * | 11/1998 | Krsul et al. . | |
| 5,872,849 * | 2/1999 | Sudia . | |
| 5,915,022 * | 6/1999 | Robinson et al. . | |
| 5,999,625 * | 12/1999 | Bellare et al. ...................... | 705/64 |
| 6,131,090 * | 10/2000 | Molva et al. ...................... | 713/159 |

FOREIGN PATENT DOCUMENTS

| | | |
|---|---|---|
| 518365 | 12/1992 | (EP) . |
| 772165 | 5/1997 | (EP) . |
| 0 889 617 A2 * | 1/1999 | (EP) . |
| WO96/41316 | 12/1996 | (WO) . |
| WO97/03423 | 1/1997 | (WO) . |

OTHER PUBLICATIONS

O'Mahony et al., "Electronic Payment Systems", Artech House Inc. pp. 168–181 and 188, 1997.*

(List continued on next page.)

Primary Examiner—James P. Trammell
Assistant Examiner—Thomas A. Dixon
(74) Attorney, Agent, or Firm—Burns, Doane, Swecker & Mathis, L.L.P.

(57) ABSTRACT

Techniques for providing secure electronic communications, for example communications relating to asset trading, are described. Symmetrical usage of encryption keys by first and second parties engaged in these communications provide enhanced security. The establishment of trusted registries, e.g., databases, which include electronic asset representations, allow for trades to be enacted without significant human intervention.

35 Claims, 9 Drawing Sheets

OTHER PUBLICATIONS

Excerpts—"Basic Protocols", pp. 58–60; "Bit Commitment", pp. 71–74; "Digital Cash", pp. 117–124; and "Blind Signature", pp. 403–404—*Applied Cryptography*, by Bruce Schneier, John Wiley & Sons (1994).

R. Anderson et al., "Net Card—A Practical Electronic–Cash System", Lecture notes in Computer Science, Apr. 10, 1996, pp. 49–57.

Stefan Brands, "Electronic Cash on the Internet", Proceedings of the Symposium on Network and Distributed System Security, pp. 64–84 (Feb. 16, 1995).

H. Burk et al., "Value Exchange Systems Enabling Security and Unobservability", Computers and Security International Journal Devoted to the Study of Technical and Financial Aspects of Computer Security, vol. 9, No. 8, pp. 715–721 (Dec. 1, 1990).

D. Chaum, "Security Without Identification: Transaction Systems to Make Big Brother Obsolete", vol. 28, No. 10, pp. 1030–1044 (Oct. 1, 1985).

D. Chaum et al., "Untraceable Electronic Cash", Advances in Cryptology, Santa Barbara, Aug. 21–25, 1998; pp. 319–327 (Jan. 1988).

Tatsuaki Okamoto et al., "Universal Electronic Cash", Advances in Cryptology, Santa Barbara, Aug. 11–15, 1991; pp. 324–337 (Jan. 1, 1991).

* cited by examiner

*Fig. 8*

| MY ID | number of ICONs to be traded e.g. 3 | ID of the other trading party | number of ICONs to be received (2) | (1) |
|---|---|---|---|---|
| first ICON to be traded | | bit pattern now stored in registry | | (2a) |
| | | new bit pattern to replace it | | (2b) |
| second ICON to be traded | | bit pattern now stored in registry | | (3a) |
| | | new bit pattern to replace it | | (3b) |
| third ICON to be traded | | bit pattern now stored in registry | | (4a) |
| | | new bit pattern to replace it | | (4b) |
| first ICON expected to be received; Guaranteeing institution | | expected bit pattern to be received | | (5a) |
| | | CRC code computed on inspected ICON PT | | (5b) |
| second ICON expected to be received; Guaranteeing institution | | expected bit pattern to be received | | (6a) |
| | | CRC coded computed on inspected ICON PT | | (6(b) |

SYMMETRICALLY-SECURED ELECTRONIC COMMUNICATION SYSTEM

BACKGROUND

The present invention relates generally to techniques and systems for securing and synchronizing electronic communications between parties, e.g., over the Internet, and more particularly electronic communications involving financial transactions.

Methods for providing electronic or virtual cash by, for example, using "smart" cards having processors embedded therein are known in the art as an alternative to traditional plastic credit cards for guaranteeing payment from a buyer to a seller. These prior proposed methods secure the trade in one direction only, namely they provide some guarantee to the seller that he will get paid, but no guarantee to the buyer that he has received or will receive the wares, property or service expected.

A description of techniques relating to smart cards and the like may be found, for example, on the Internet at WWW-.DIGICASH.COM. These techniques are concerned with eliminating the inconvenience to the merchant associated with the need to verify the authenticity of credit cards by making a telephone call to the issuing institution. Such systems are suitable primarily when the merchandise is physically inspected and accepted by the buyer at a retail outlet, for example. The one-way security guarantees provided by electronic cash make use of public key encryption algorithms, e.g., RSA, in which a message may be encrypted with a secret key but decrypted with a published key, or vice versa, depending on whether it is desired to ensure that no false messages can be sent or whether it is desired to prevent messages being intercepted and decrypted. As is also known, both techniques can be used at once to authenticate the source and to prevent interception.

Other forms of electronic trading have evolved in the context of stock markets and exchanges such as the NASDAQ, the Chicago Grain Exchange and the like, a purpose of which is to facilitate brokerage services by providing computer assistance in preparing paperwork of the traditional kind, such as transaction confirmations and settlements. The sort of electronic trading assistance provided by these computer systems used at major exchanges is therefore not concerned with providing an automated means of registering the ownership of assets and guaranteeing the nature and existence of assets, so much as providing mechanisms for traditional brokers to execute transactions more efficiently. Such systems are described for example in U.S. Pat. Nos. 5,375,055, 5,297,031, 5,297,032, 5,101,353 and 5,305,200.The nature and existence of assets being exchanged in these conventional trading systems still relies for its guarantees upon a trusted human broker.

Conventionally, many parallel systems exist for registering the ownership of major assets, including, for example, the Department of Motor Vehicles (DMV) for registering ownership of motor vehicles; the local courthouses, for registering the ownership and descriptions of real estate, as well as brokerages and banks for registering the ownership of cash, stocks and bonds and other commercial paper. These prior art systems, originally conceived to be run entirely by human clerical effort, have only relatively recently evolved to use computers to facilitate the manipulation of paper according to traditional principles in order to accomplish a greater volume of transactions with reduced clerical effort. Thus, it would be desirable to provide new systems and techniques for securing and synchronizing trade communications without the involvement of a traditional human broker or trusted institution to provide additional transactional efficiency.

SUMMARY

Exemplary embodiments of the present invention use a public key encryption algorithm to create encrypted descriptions of assets that are recorded in an electronic database as a trusted registry. Several such registries may exist, allowing a distributed system. The description of an asset is created by a properly authorized and regulated issuing institution, such as a bank, and the description is encrypted using a secret key known only to that institution. At this stage, the description of the asset may be decrypted and read by anyone using the published "public key" of the authorized institution. For example, a Federally Insured Deposit may be described by a database record encrypted using a secret key known only to the Federal Reserve Bank, but the record can be decrypted and read using the public key of the Federal Reserve. A person decrypting the record can be assured that the record could only have been created by the Federal Reserve as no other person has access to the correct encryption key.

The present invention includes further encryption of database records using the public key of the owner of the assets that the record describes. These doubly-encrypted records can only be deciphered using the secret key of the owner, without which they are a worthless collection of seemingly random binary bits or computer symbols. Thus it is of no value to a third person to steal such a record as it cannot be converted into something of tradeable value without knowledge of the owner's secret key.

When a first party agrees to transfer an asset to a second party as part of an electronic trade, the owner retrieves the doubly-encrypted asset description from the database and decrypts it using his secret key. The first party then re-encrypts the asset using the public key of the other party and transmits the result to the second party. Only the second party can decrypt the transmitted message using his secret key, so the information cannot be stolen in transit. The second party decrypts the message using his or her secret key and then decrypts it again using the public key of the issuing or guaranteeing institution. If the description of the asset matches the expectations of the second party, he or she can be assured that the asset exists and its tradeability is guaranteed by the issuing institution, without needing to contact the issuing institution.

Reciprocally, the second party transmits the description of a second asset being exchanged for the first party's asset. This second asset may, for example, comprise a cash deposit guaranteed by a different institution, but using the same method, i.e. using the secret key of the guaranteeing institution to "sign" the description of the deposit. The message from the second party to the first party is similarly encrypted using the first party's public key to prevent exposure in transit.

When both parties are satisfied with the respective descriptions of the asset being exchanged, both parties transmit respective messages to the trusted electronic registry or registries, encrypted using their secret keys, which the registry can decrypt using the public keys of the parties, thus verifying their authenticity. Each message identifies the record in the registry that the respective owner is agreeing to trade, for example by providing to the registry the encrypted symbol pattern of that record as it is currently stored in the registry, and the re-encrypted symbol pattern that represents the asset as belonging to the new owner. The message also informs the registry of the encrypted symbol pattern to be received from the reciprocal party in exchange.

The registry itself need have no knowledge of what these bit patterns represent, only that the trading parties have agreed to trade them. When the registry detects a match between, on the one hand, the symbol pattern expected to be received from the second party by the first party, and, on the other hand, the symbol pattern received from the second party, and vice versa, then the computer of the automated registry will overwrite the original asset descriptions encrypted with the public keys of the original owners with the new asset descriptions encrypted with public keys of the respective new owners, thus synchronizing the exchange.

When practicing the present invention, two parties may make electronic trades, over the Internet for example, of assets which are guaranteed by one or more originating institutions, without having to contact the originating institutions and without the need to involve a human broker to execute transaction papers in the traditional way, thus providing for greater speed and security in trade.

BRIEF DESCRIPTION OF THE DRAWINGS

These and other objects, features and advantages of the present invention will be readily understood by those skilled in the art upon reading the following detailed description in conjunction with the drawings, wherein:

FIG. 8 is an exemplary message format for a message between a party and a registry according to an exemplary embodiment of the present invention.

DETAILED DESCRIPTION

Figure 1:
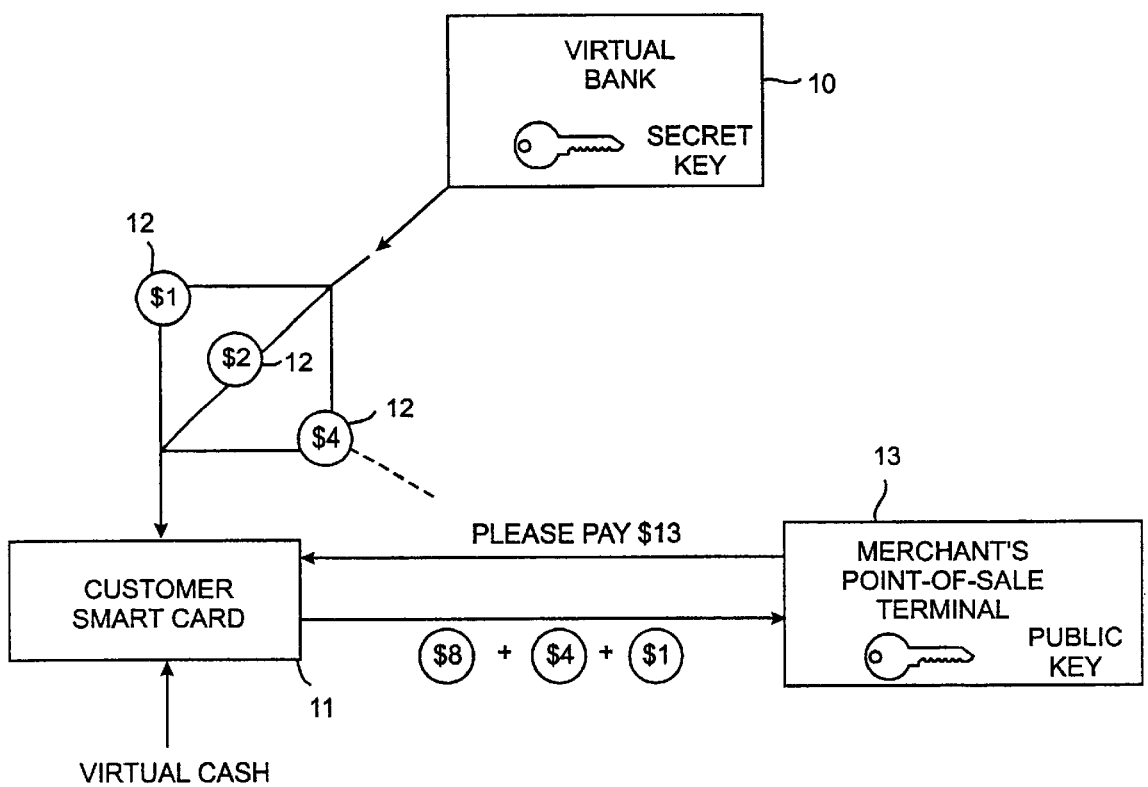
FIG. 1 illustrates a conventional electronic communication system.

FIG. 1 shows a conventional system. Therein, a virtual bank 10 issues virtual coins 12 in various denominations which are "signed" by being encrypted with the bank's secret key. The coins consist of digital bit patterns that can be readily decrypted using the bank's published public key.

The virtual coins issued by the bank to a specific customer are stored in an electronic credit card or "smart card" 11. They may also be stored in any other form of memory device, e.g., that in a handheld wireless telephone. When the memory device is pocket-portable, such as a smart card or handheld cellular phone, the function of storing virtual cash is typically referred to as an "electronic wallet" function.

A smart card can be used to purchase merchandise at a store equipped to read the smart card electronically. A point-of-sale terminal 13, for example, can comprise an interface for smart cards which may be a connector or a wireless interface using radio, infra-red or optical frequencies. One such optical interface comprises an LCD display on the card used to display bar codes which are readable by a conventional laser scanner, already found in many retail stores.

The point-of-sale terminal 13 sends a message to the card 11 over the standard interface requesting payment of a specified amount, for example $13.00. The card responds by sending a message including the bit patterns of virtual coins, the denominations of which add to the requested amount— for example an $8 coin, a $4 coin and a $1 coin in the $13 example. The point-of-sale terminal 13 decrypts the bit patterns of the coins transferred using the public key of the issuing virtual bank 10. The coins will be decrypted into readable bit patterns, verifying their denominations, only if they are genuine, as only the bank, using its secret key, can construct bit patterns which can be decrypted using its public key, making forgery impossible. Cloning, however, is possible by simply copying the bit patterns of genuine virtual coins. Cloning cannot be prevented by this prior art system, but can at least be made detectable by giving each coin a serial number. Upon a merchant's eventual redemption at the bank of a virtual coin issued by the bank, the bank can check if that serial numbered coin had already been redeemed. Even with this detection scheme, however, it is not clear which copy is the clone, since first spent does not necessarily imply true copy. Thus, wherever virtual coins are stored, they are vulnerable to hackers obtaining access to the bit patterns and cloning them.

The present invention solves this problem by, for example, storing coins in a form encrypted with an encryption key which is not publicly known, e.g., the owner's secret key, or at least in an encrypted form that is only decipherable using the owner's secret key. For example, the coins could be encrypted using the public key of the owner and can then only be decrypted using the owner's secret key.

An enhancement to the conventional system of FIG. 1 according to the present invention therefore includes the steps of:

(a) The virtual bank also encrypts the coins using the public key of the smart card or electronic wallet to which they are being transferred.

(b) The card or wallet decrypts the coins using its secret key when paying to a point of sale terminal. The wallet furthermore encrypts the coins before outputting them using the public key of the point-of-sale terminal to which they are being paid.

Thus, since only the card or wallet can decrypt coins sent from the bank, they are not vulnerable to interception in transit, which may, for example, involve a wireless link. The coins are also not vulnerable to being stolen from the wallet, as they are no use without the secret key, and the secret key can be stored in a memory that cannot be accessed from the outside. For example, the card or wallet can include an integrated processor and memory chip having an external I/O interface through the processor. The processor can have a fixed program that reads information through its I/O interface, processes the information together with the secret key that only the processor can access, and outputs a result depending on the information read in and the secret key. The processor would have no program, however, that will respond to or even understand a request through the I/O interface to retrieve and output the secret key.

Furthermore, upon payment of a sum from the wallet to the point-of-sale terminal, the wallet can not only decrypt the coins using the wallet's secret key, but can re-encrypt them using the point-of-sale terminal's public key, so that coins in transit cannot be stolen as they can only be decrypted using the POS terminal's secret key. These coins are not vulnerable to being stolen from the POS terminal's memory, as they are stored in encrypted form. If the POS terminal is furthermore one of many in a large store, it may be connected to a central corporate computer housed in a secure area, with the corporate secret key stored in the central computer area. The POS terminal would send encrypted coins received from wallets to the corporate computer for verification, a procedure which would appear almost instantaneous to the cashier and customer.

Figure 2:
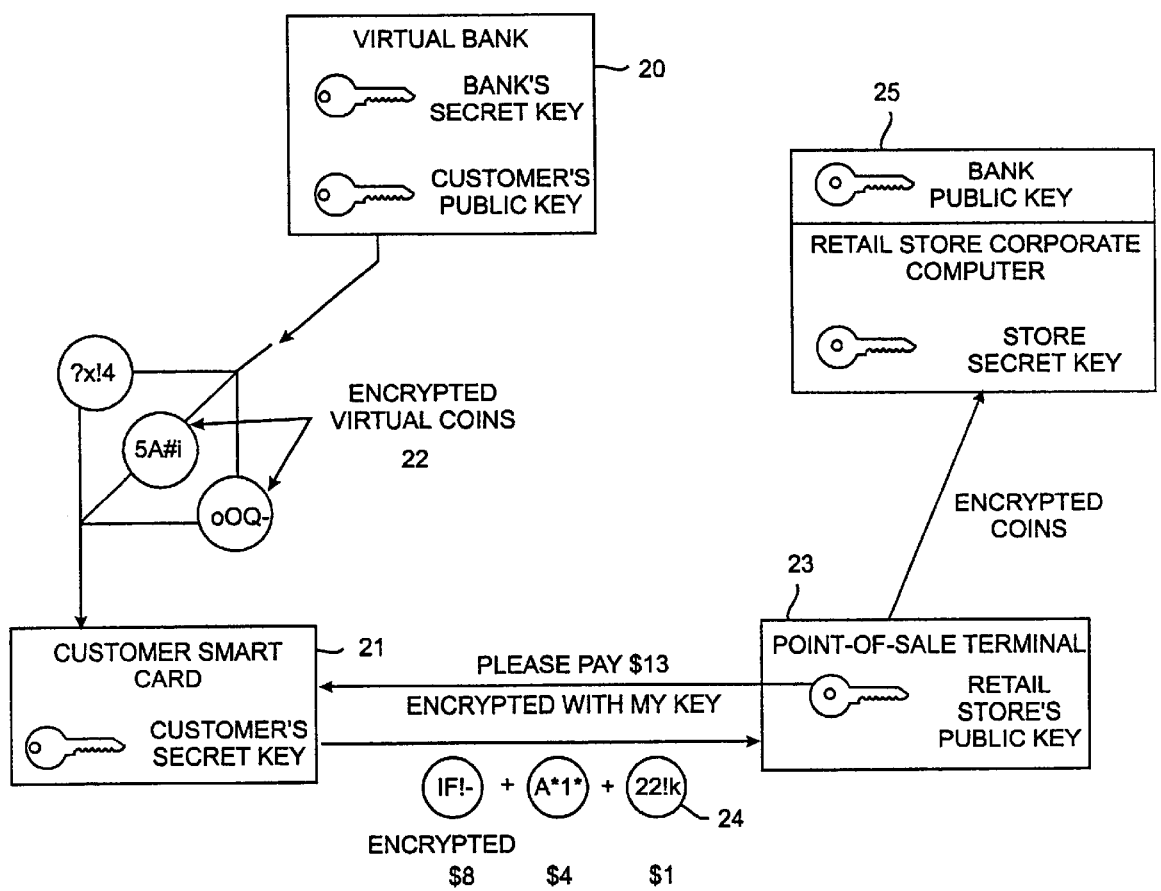
FIG. 2 illustrates an electronic communication system according to an exemplary embodiment of the present invention.

The above described security-enhanced procedure according to the present invention is illustrated in FIG. 2. The virtual bank 20 issues virtual coins 21 to a customer's smart card 22, the coins being encrypted first using the bank's secret key and secondly using the customer's public key known to the bank. The encrypted coins are stored in the customer's smart card 22, together with the customer's secret decryption key as described above. A POS terminal 23 at a retail store requests payment of a certain sum, to be made in coins encrypted with the store's public key, which accompanies the electronic request. Sending the public key with the request is an alternative to storing keys for all possible retail outlets, although a limited subset could be stored therein. The smart card 21 decrypts the required coins using the customer's secret key and then re-encrypts them using the store's public key, both operations taking place inside the smart card's processor. The store-encrypted coins are then sent to the POS terminal 23 and optionally thence to the store's corporate computer 25 for verification. The corporate computer 25 decrypts the coins using the store's secret key, and then decrypts the coins again using the bank's public key. At this point the coins become readable and may be verified to have come from the virtual bank 20 and to have the expected denominations. The corporate computer 25 sends an "accept" message to the POS terminal 23 that the payment has been accepted, or alternatively a "reject" message. Procedures upon rejection are not detailed herein, but may, for example, include contacting the virtual bank 20 electronically with the name of the customer or ID of the smart card and the bit patterns of the offending coins to determine what action to take.

Figure 3:
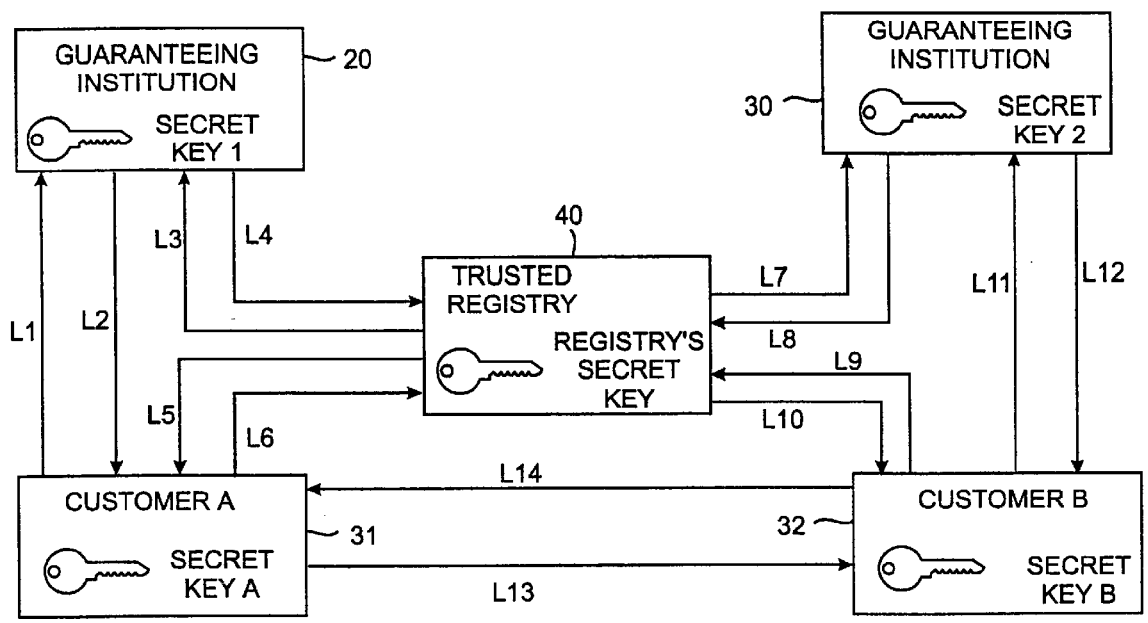
FIG. 3 depicts an electronic communication system according to another exemplary embodiment of the present invention.

Neither the conventional system described above with the aid of FIG. 1, nor the enhancements described above according to the present invention with the aid of FIG. 2 are concerned with guaranteeing the merchandise to the buyer, but are rather concerned with guaranteeing payment to the seller. Merchandise bought at POS terminals is assumed to have been inspected, accepted and approved by the buyer before exiting the store. Other exemplary embodiments of the present invention are concerned with trading assets having a broader definition than just cash or virtual money, i.e., including all things of value that can be described with an encrypted description hereinafter referred to as an ICON. An ICON is a distinct bit pattern, which, when decrypted, reveals and guarantees the nature of the asset that it stands for. A method of creating ICONs that represent objects of value and trading them will now be described with the aid of FIG. 3.

At least one Trusted Registry 40 is equipped to communicate via a public telecommunications service such as the Internet, for example. Communications may be made secure by use of the registry's secret key/public key pair according to well known conventional techniques.

A trusted institution such as a bank 20 or other guaranteeing institution 30 can thus communicate with a registry located elsewhere, using communications links denoted by references L3,L4 and such institutions are the only entities from which the registry will accept DEPOSITs of ICONs as distinct from TRADEs of ICONS. The distinction between a DEPOSIT and a TRADE is that a deposit creates a new ICON in the registry without necessarily being matched by the deletion of a pre-existing ICON. How the registry distinguishes institutions 20, 30 from non-institutional customers 31, 32 will be described later.

Now suppose that a customer 31 wishes to represent a cash deposit or an object of value such as ownership of real estate by an ICON stored in a selected registry 40. The customer first identifies an institution that will agree to stand behind the value or nature of the ICON deposited, and create such an ICON. If the ICON represents cash for example, then the institution can require that the customer has deposited in escrow or other blocked account an amount of real money corresponding to the amount of virtual money the ICON represents. The escrow or blocked account, although originally created at the behest of a particular customer, becomes an anonymous account once the ICON has been placed in registry 40, as the ICON from that point on may undergo many changes of ownership, while remaining redeemable for the contents of the escrow account.

If the ICON is to represent real estate, as an alternative example, the guaranteeing institution may perform a search to verify the ownership of the real estate as well as a physical inspection, before creating the ICON. Moreover, the institution would most likely require that it hold the real estate deeds so long as the ICON was in circulation, as the ICON is eventually redeemable by the institution for the property it represents and described therein. At least some of the negotiation between the bank 20 and its potential customer 31 can take place electronically using secure Internet links denoted by L1, L2 for example, by telephone, or by traditional face-to-face means.

When the institution 20 or 30 agrees to create and guarantee an asset-representative ICON, it creates a plain text description of the asset and then enciphers that description (i.e., signs it) using the secret key of the institution. The institution then further encrypts the ICON using the public key of the customer 31 or 32 and then transmits the encrypted ICON to the registry 40 with a request to deposit the ICON in association with the ID of the customer, using communications links L3,L4.

The customer can be uniquely identified by his public key, as one alternative. The entire message from the institution 20 or 30 to the registry 40 can be encrypted using the secret key of the institution and the public key of the registry, which keys can be communication keys different than the secret/public key pairs used by institutions to sign ICONS. The registry 40 deciphers the message from the institution using first the institution's public key and then the registry's secret key, thus revealing a still-encrypted ICON, but the plain text ID of the customer. Furthermore, some check bits such as a Cyclic Redundancy Check Code (CRC) are added to the message before encryption by the sender, and are checked after decryption by the receiver. Thus the registry can use the CRC or check bits to verify that a decrypted message has decrypted correctly, even though the ICON is still encrypted and the ID of the customer does not alone lend itself to verification. Only a message created using the secret code of the institution will decrypt correctly using the public code of the institution to reveal the correct check bits, thus verifying to the registry that it can accept the ICON for deposit. The registry has no responsibility to verify that the identified customer actually exists or that the ICON represents anything in particular. What the ICON represents can thus remain a secret known only to the customer.

The transaction techniques described above use a public key encryption system based on a two part key, one part for encryption and one part for decryption. A conventional public key encryption algorithm suitable for use in the present invention is the RSA technique. This is based on the mathematical identity:

$$|X^y|_z \equiv X \tag{1}$$

for every possible message X treated as a large number, and where z is the product of primes:

$$z = P1 P2 P3 \ldots P(n) \text{ and} \tag{2}$$

$$y = 1 + (P1-1)(P2-1) \ldots (P(n)-1) \tag{3}$$

In the conventional RSA algorithm, n=2, i.e. only two primes are used to form z, and 'y', being non-prime, is factorized into two parts called the public key and the private or secret key, respectively.

The two key parts, when multiplied, equal the value 'y' in equation (3), which, when used in equation (1), transform any message X back into itself, thus rendering it readable. However, it is possible to extend the RSA algorithm by factorizing 'y' in equation (3) into three or more parts, and distributing the parts to different parties. Then it can be possible for certain messages only to be constructed by more than one party in collaboration, or alternatively to provide the capability for more than one party to collaborate in order to render a message decipherable.

In anticipation of future fraud attempts, the number of check bits used, and the length of signature and communications keys, should be substantial to render it unproductive for a person of criminal intent to attempt to create fraudulent ICONs, or to misrepresent his website as a respectable financial institution or trusted registry. In state-of-the-art systems for public key encryption, security depends on the enormous amount of computational effort required to factorize a given product of two large prime numbers to reveal the prime numbers. Even larger prime numbers are justified when it comes to financial security than may be justifiable for secure communications alone, as the security of billions of encrypted ICONs guaranteed by millions of institutions for billions of customers the world over could eventually be at stake. Prime numbers of the order of 1000–2000 bits in length, the product of two such being greater than 2000 bits in length, are thought at the present time to be secure for the foreseeable future, still observing certain restrictions on the choice of primes such that their product cannot be easily factorized by a reverse Miller test for factors.

Thus by the above method, ICONs representing cash or other assets are created in the "names" of different customers and stored in one or more registries 40. A "trusted" registry is one that will, according to the principles described above, only accept as new deposits ICONs received from a trusted institution, which is identified by the signing on communications with the registry using a secret key that is listed in a list of trusted institutions. Likewise, a customer 31 or 32 should verify that a registry he is dealing with is a trusted registry that will only accept such deposits, which the customer can do by similar means, i.e. by verifying that the communications key of the trusted registry is one of a list of keys belonging to trusted registries. Likewise, trusted institutions can verify that a registry into which it is depositing a newly-created ICON is a trusted registry by virtue of the communications key used to communicate with the registry existing in a list of approved registries.

To illustrate the effectiveness of communication techniques according to the present invention, consider the following example. Suppose that two customers 31 and 32, in communication via the Internet (for example) using links L14 and L13 arrive at an agreement to trade assets. One customer 31 may, for example, agree to pay a sum of money to the other 32 in return for a non-cash item or asset owned by the other.

In the simplest case, the first party 31 will possess an ICON stored in registry 40 exactly representing the agreed payment sum, and the other party 32 will possess a single ICON stored in the same registry 40 representing the non-cash item the first party has agreed to purchase, each ICON being guaranteed by an appropriate institution such as institution 20 or institution 30.

The second party 32 sends a request to the registry 40 to temporarily withdraw an ICON, using communications links L9 and L10. This transaction is secured using the communications keys of both the registry 40 and customer 32. Optionally, the ICON may be electronically identified in the registry as temporarily withdrawn by the owner, but the ICON is not at this time destroyed, it is merely locked and cannot be withdrawn or traded while the original trade is ongoing. This in itself is not a protection against an owner cloning a withdrawn ICON, but it will be explained later why such cloning is an unproductive method of attempting fraud.

Customer 32 decrypts the withdrawn ICON using his secret key. Customer 32 then re-encrypts the ICON using the public key of the first party 31 and transmits the result to customer 31, using secure communications links L13 and L14 which may be secured by different keys than those used to sign ICONS. Customer 31 receives the encrypted ICON and decrypts it first using his own secret key, and then using the public key of the indicated guaranteeing institution, institution 30 for example. At this point the description of the non-cash item he is purchasing is revealed to him together with the fact that its existence and nature, as described, is guaranteed by the trusted institution 30. Reciprocally, customer 31 temporarily withdraws the ICON representing the cash payment he has agreed to make to customer 32, and after decryption using his secret key and re-encryption using customer 32's public key, transmits it to customer 32. Customer 32 decrypts this ICON using his secret key and then the public key of guaranteeing institution 20, for example, to verify that it represents the agreed cash payment and that institution 20 is guaranteeing that it is eventually redeemable for real money, if ever required.

Once both parties have inspected their respective wares and agreed to the trade, they both communicate with the registry 40 using secure links L5 and L6 and L9 and L10, respectively, with instructions to make the trade. Customer 31 then transmits the bit pattern of the temporarily withdrawn ICON he has agreed to trade with customer 32, together with the re-encrypted ICON signed with customer 32's public key, and the bit pattern he expects to receive in return from customer 32. Customer 32 likewise transmits the bit pattern of his temporarily withdrawn ICON, the bit pattern of the ICON re-encrypted with customer 31's public key, and the bit pattern of the ICON he expects to receive in return from customer 31. The registry then matches the bit pattern customer 31 expects with the bit pattern provided by customer 32 and conversely the bit pattern customer 32 expects with the bit pattern received from customer 31. Upon detecting a match, the trade is executed by finding the bit patterns retained in blocked account for the temporarily withdrawn ICONS, deleting them, and replacing them in the database with the new ICONs signed in the names of the new owners.

In designing financial systems, security against fraud is of paramount concern. Consider now that customers 31 and 32 collaborate in fraud in the following manner. Each has deposited ICONs worth $1000 in registry 40 and ICONs worth $10000 in a second registry, not shown. They simultaneously transact to trade their $1000 ICONs in registry 40 and their $10000 ICONs in the second registry, by the process of temporary withdrawal described above. However, in informing registry 40 to trade the $1000 ICONS, they substitute for $1000 re-encrypted bit patterns the $10000 bit patterns withdrawn from the second registry, thus causing registry 40 to delete $1000 ICONs and store $10000 ICONS, while the second registry continues to store $10000 ICONS. They can both now continue to trade with other parties using the total of $20000 stored in both registries, and have succeeded in fraudulently cloning virtual money.

The above is only one example of many potential security vulnerabilities that should be considered in devising an essentially umnonitored system of automatic, electronic trading. The example above may be prevented according to the present invention by the following technique.

In addition to providing digital asset descriptions underwritten by secret key, the issuing institution provides a digital check pattern, such as a cyclic redundancy check code, that is a function of the plain text content of the asset description, but which is then enciphered using a symmetrical ciphering key—for example, by bitwise modulo-2 adding a code or transposing bits in a way known only to the institution. Alternatively, the check code can be enciphered using the institution's secret key. That guarantees that no other party can easily forge a check code that a forged message will pass.

According to one security aspect already described, only qualified institutions may create and insert new asset ICONs in the registry's database. As they do so, the encrypted check patterns are also provided and associated with each ICON. The encrypted check patterns are, however, not released to other individuals. These patterns may only be transmitted from the registry in secure communications with a qualified institution. Thus, although an individual inspecting the plain text content of an ICON can recompute the plain text CRC, he does not know the bit pattern of the corresponding institutionally encrypted CRC that is stored in the registry.

The encrypted check patterns depend on the plain text within the ICON which only an authorized institution can create using its secret key, and accompany the ICONs through changes of ownership in intra- or inter-registry operations. Thus, in the above example of a potential fraud, while the registry may, during a trade, unknowingly accept a fraudulent ICON to replace a valid ICON, the check code of the original ICON will remain appended to the new ICON on the assumption that the new ICON has the same underlying plain text and thus describes the same asset, only re-encrypted for different ownership. An individual attempting to tamper with an ICON would therefore at worst only succeed in invalidating it by creating a mismatch between the ICON and its check code, to which he is blind.

As described above, the second party to a trade will have collaborated in any fraud attempt, by instructing the registry to accept an ICON which he knows will not pass the CRC of the ICON it is replacing. Thus, no innocent party is harmed when an ICON is invalidated by a fraud attempt. On the other hand, invalid ICONs could be created in the database which it may then be attempted to palm off on to a third party.

A further security measure prevents the latter also; during a trade, the party inspecting an offered ICON to verify that it meets his expectations decrypts it to inspect the plain text and also recomputes the CRC over the plain text. The offered ICON passed to him from his trading counterpart is first subject to any link protocol deciphering necessary, and then deciphered using his secret key. Then, using the guaranteeing institution's public key, it is further deciphered to reveal plain text if and only if the ICON genuinely originated from that institution. The recipe for computing the unencrypted check code from the plain text is published, and either party with access to the plain text can thus compute the plain text check code. This is passed to the registry by the party accepting an ICON in a trade, so that the registry can verify that the CRC matches a stored CRC of an ICON which the offered ICON will eventually replace. The registry decrypts the CRC of the existing ICON using the guaranteeing institution's secret key and compares the plain text ICON with the recomputed ICON received from a trading party. If there is no match, the trading party supplying the recomputed ICON is warned and the registry will not execute the trade.

The registry has the option of requesting that the institution perform the comparison when the registry is unable to decrypt an encrypted check code, e.g., when a symmetric cipher is used to protect the check code. Each institution may select a particular ciphering method for the check code and registries may be designed to handle any type of check procedure, depending on whether the institution's policy permits an autonomous check procedure that does not involve the institution in every transaction.

Figure 4A:
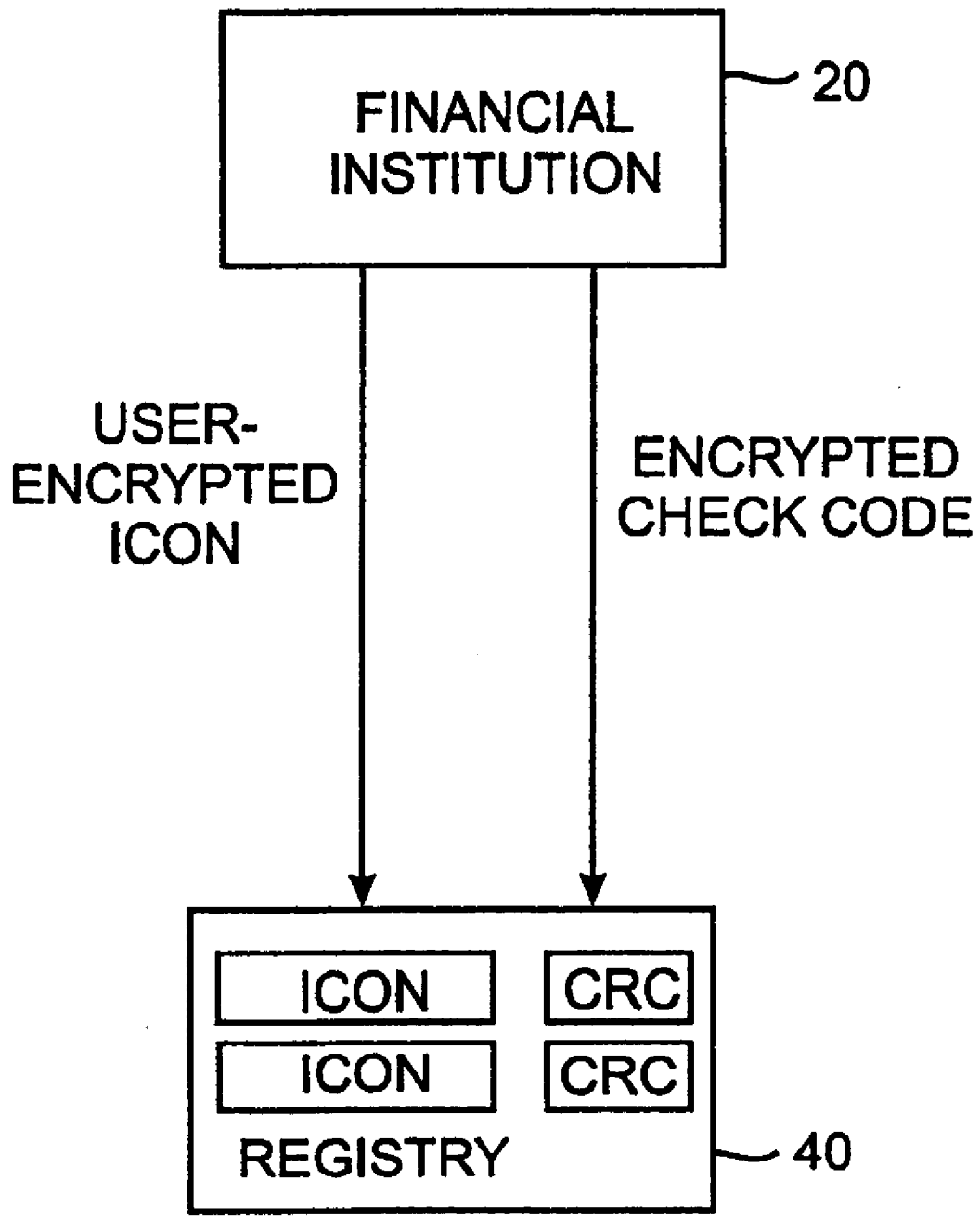
FIG. 4(a) illustrates a data flow according to exemplary security techniques of the present invention.
Figure 4B:
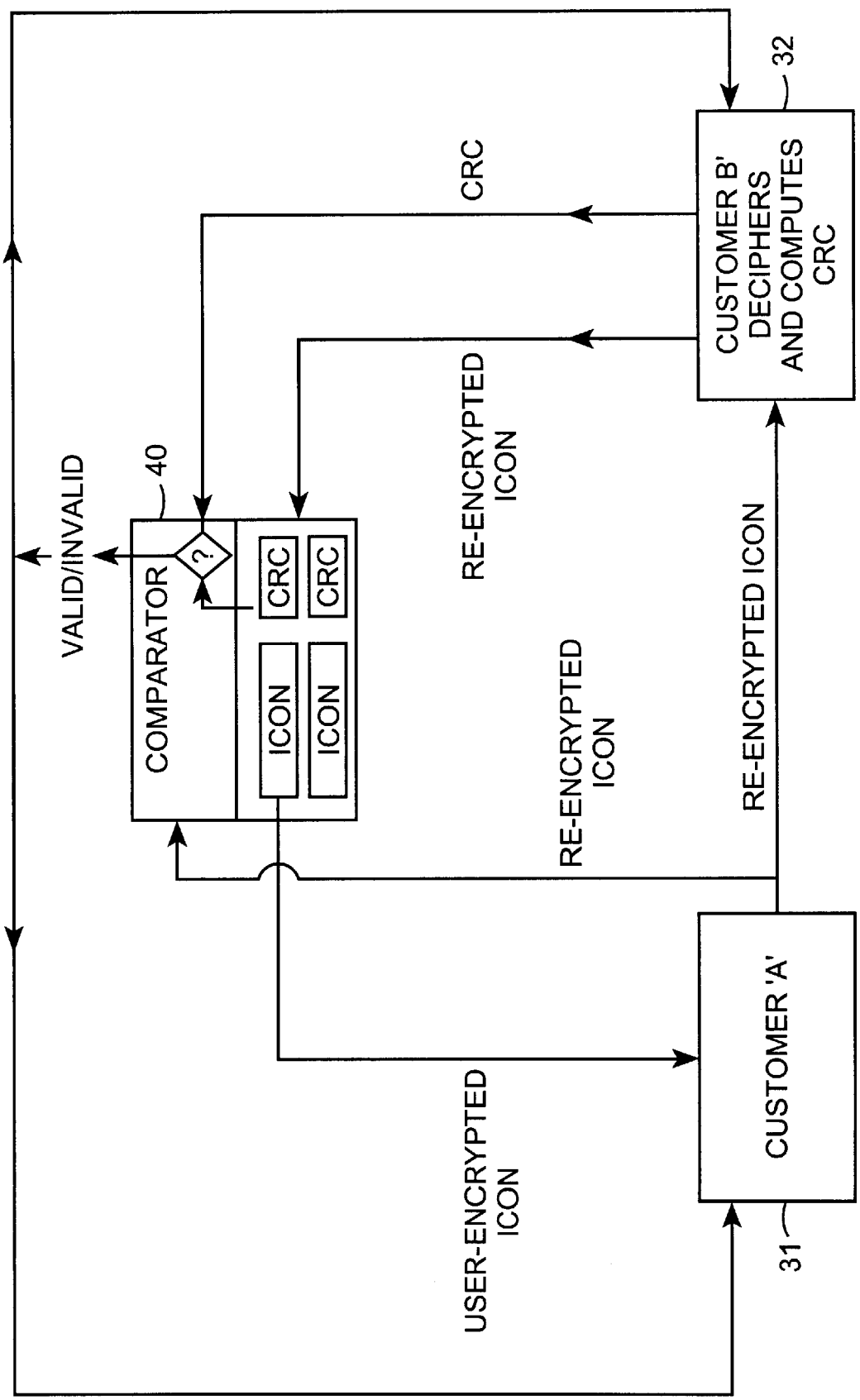
FIG. 4(b) illustrates another data flow according to exemplary security techniques of the present invention.

FIGS. 4(a) and 4(b) illustrate the data flow in the above-described security operations. In FIG. 4(a), the financial institution 40 creates an ICON after negotiation with a customer that the ICON shall represent some real asset. During this negotiation, the ICON has been encrypted with the customer's public key so that only that customer can decipher it using his secret key. The institution has also computed a CRC check code, having a number of bits adequate to ensure negligible probability of guessing it by chance, such as 64 bits. The check code is a function of the plain text content of the ICON, and both the user-encrypted ICON and the CRC code are transmitted by the institution to the registry using an encrypted link. The user-specifically encrypted ICON and the attached CRC are then stored in the registry database together with an indication of the customer to which it belongs (not shown).

Figure 5:
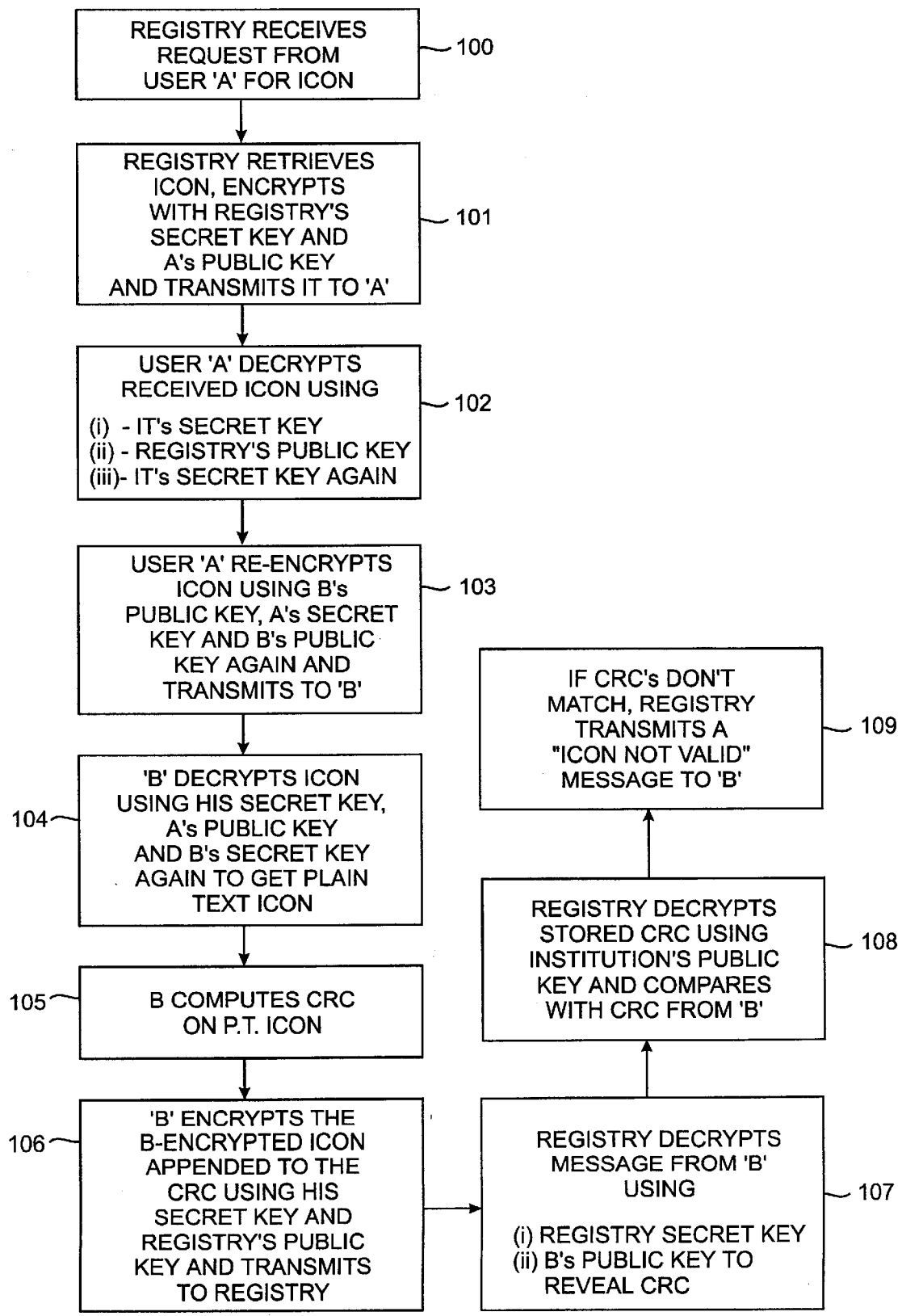
FIG. 5 is a flow chart illustrating a method for preventing fraud according to the present invention.

FIG. 4(b) illustrates the flow of data in one direction of a trade, the steps of which are specified in the flow chart of FIG. 5. Customers 31 and 32 have agreed to a transaction in which customer 31 shall deliver an ICON re-encrypted to be customer 32 specific. Customer 31 first requests the ICON from the registry 40 at step 100. In principle this is unnecessary if customer 31 has retained a copy. The registry sends customer 31's requested ICON over an encrypted link after encrypting same with the registry's secret key and customer 31's public key at step 101, but does not send the CRC. Customer 31 decrypts the received ICON using his secret key, the registry's public key and his secret key again at step 102. Customer 31 then re-encrypts the ICON using customer 32's public key, his own secret key and customer 32's public key again as shown in step 103 and transmits the result to customer 32 over a further-encrypted communications channel. Customer 32 receives the message and decrypts the communications layer protocol and then decrypts the encrypted ICON using his secret key and customer 31's public key to reveal plain text at step 104. Customer 32 may then inspect the nature of the asset that the ICON describes. Customer 32 computes (at step 105) the CRC from the plain text ICON using a recipe published by the guaranteeing institution. Customer 32 then transmits the encrypted version of the ICON together with the CRC to the registry using a secure communications channel as described at step 106.

The registry receives the customer 32 encrypted ICON from customer 32 and also from customer 31. Customer 31 is indicating to the registry that the customer 32 encrypted ICON will replace the original customer 31 encrypted ICON upon executing the trade. Customer 32 is indicating to the registry the bit pattern of the ICON he expects to receive from the trade. The ICON received by the registry from customer 32 is decrypted as shown in block 107. If the customer 32 encrypted ICONs received from both customer 31 and customer 32 match at the registry, one criteria for executing the trade is satisfied. The registry also decrypts the CRC of the ICON that customer 31 indicates he wishes to trade, using the guaranteeing institution's public key, and compares it with the CRC received from customer 32 at step 108. If they match, the customer 32 encrypted version of the ICON is confirmed as valid and customer 32 has not been deceived by customer 31 as to its nature. Otherwise, if no match is indicated, the registry warns customer 32 that the ICON customer 31 has offered is invalid and refuses to execute a trade as set forth in step 109. Reciprocally, customer 31 can be assured of the validity of the ICON he has been offered by customer 32, and if certain criteria are satisfied. Namely that (1) the ICON customer 32 expects to receive from customer 31 matches the customer 32 encrypted ICON supplied to the registry by A; (2) the ICON customer 31 expects to receive from customer 32 matches the customer 31 encrypted ICON supplied to the registry by customer 32; (3) the CRC supplied by customer 32 matches the stored CRC of the customer 31 encrypted ICON that will be overwritten by the customer 32 encrypted ICON expected to be received by customer 32 from customer 31; (4) the CRC supplied by customer 31 matches the stored CRC of the customer 32 encrypted ICON that will be overwritten by the customer 31 encrypted ICON expected to be received by customer 31 from customer 32; (5) the ICON customer 31 is offering to replace by one re-encrypted to customer 32 ownership exists in the registry; (6) the ICON customer 32 is offering to replace by one re-encrypted to customer 31 ownership exists in the registry; and (7) all communications from customers 31 and customer 32 to the registry are confirmed as bearing customer 31 and customer 32's respective digital signatures, then the registry will execute the trading of ICONS.

The above procedure thus prevents the fraudulent cloning of ICONS, in which multiple copies can be inserted in the registry registered to the same or different users, and also prevents an innocent customer from being deceived into accepting a worthless ICON by a fraudster. This procedure relies on the difficulty of creating a fraudulent ICON that produces the same CRC as a valid ICON.

While the latter is hindered by the above procedures, it is a further safeguard against fraud if a mechanism can be found to hinder modifying the plain text of an ICON such that it passes an existing CRC belonging to another ICON known to the forger. For example, ICONs are created during a negotiation between a customer and an institution, during which the customer may have some say in the exact wording of an asset description. For example, the customer may succeed in persuading the institution to unwittingly accept innocent-looking modifications to the asset description in order that, unbeknown to the institution, the plain text produces a certain CRC desired by the owner for the purposes of fraud.

Unfortunately, common cyclic redundancy check codes have a linearity property which makes it possible to generate modified bit patterns that produce any given CRC. Since the CRC of (bit pattern A).XOR.(bitpattern B) is equal to (CRC of A).XOR.(CRC of B), the following procedure may be used in a fraudulent effort to obtain a desired CRC value:

Construct a fraudulent bit pattern A having eight, 8-bit character spaces at the end of the plain text (or indeed anywhere) that are blank (assuming a 64-bit CRC is used).

Compute the CRC over the fraudulent bit pattern CRC (A).

XOR CRC(A) with CRC(B) to determine how it differs, obtaining the 64-bit SYNDROME.

Compute an 8×8-bit character pattern to fill the blank spaces that will annul the syndrome. This may be done as follows:

Construct an all zeros bit pattern except for a '1' in the first blank bit position and compute its CRC(=B1).

Repeat with the '1' in each of the blank spaces in turn, obtaining successively B2,B3 . . . B64, all 64-bit vectors.

Arrange the 64, 64-bit vectors B1 . . . B64 in a 64×64 bit Boolean matrix and invert the Boolean matrix by known techniques to obtain a new 64×64-bit inverse matrix.

Multiply the SYNDROME by the Inverse Matrix to obtain a suitable blank-filling pattern that will cause the fraudulent bit pattern to give the same CRC as the valid bit pattern.

Figure 6:
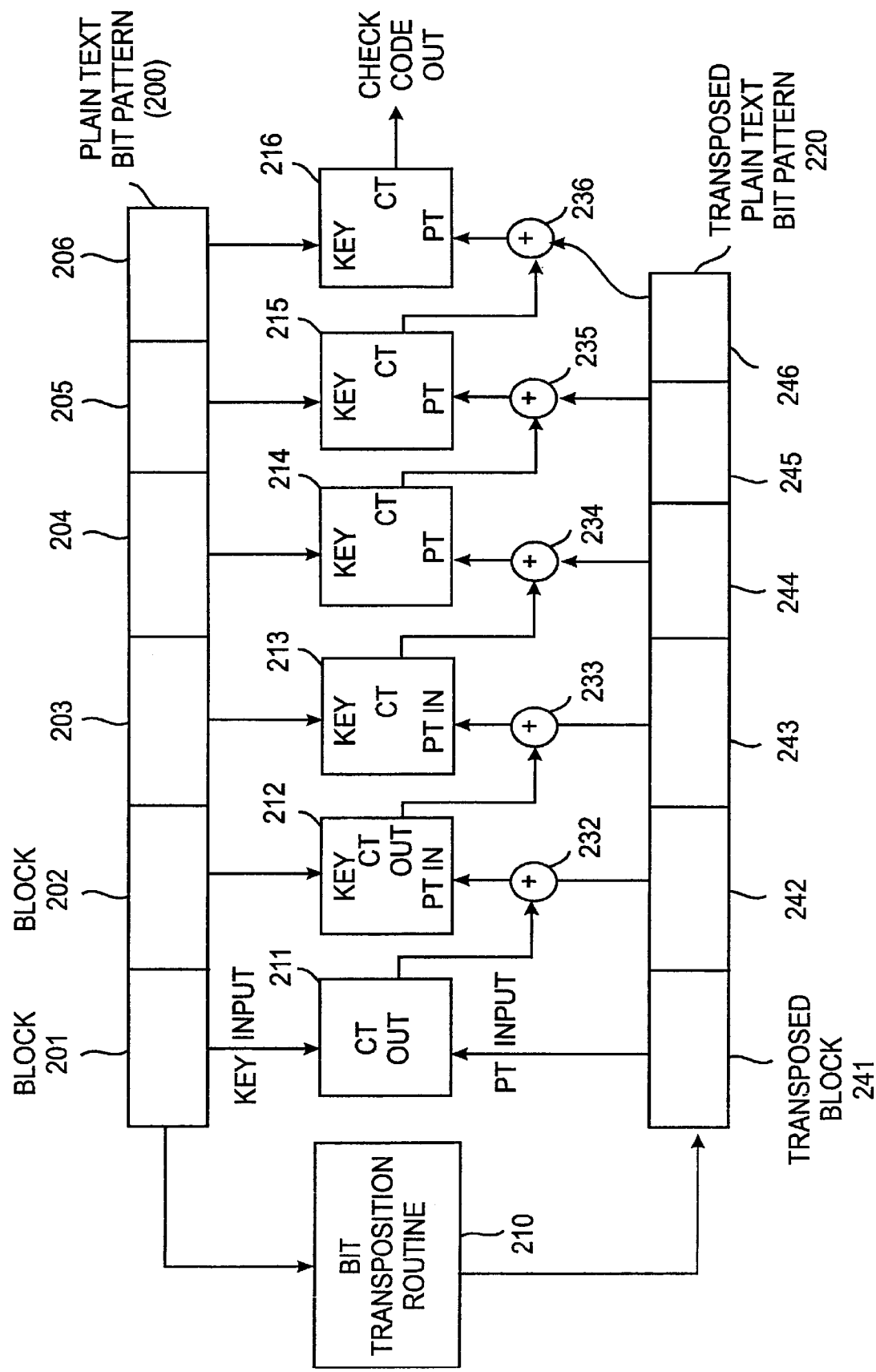
FIG. 6 illustrates non-linear CRC code generation according to an exemplary embodiment of the present invention.

This weakness can be overcome by using a non-linear check code computation as illustrated by FIG. 6. The plain text bit pattern 200 is first arranged as a sequence of bit-blocks 201, 202 . . . 206, and each bit block is applied to one input, for example the key input, of a block cipher 211 . . . 216 such as the DES algorithm. In the DES case, the bitblocks would thus each comprise 56 bits, being the DES key length, that is 7, 8-bit ASCII characters, using the ASCII parity bit according to an agreed convention, or else 8, 7-bit ASCII characters without parity bit.

The plain text bit pattern is also passed through a bit transposition routine 210, which reorders the bits according to a fixed schedule to produce an interleaved or transposed plain text bit pattern 220. The transposed bit pattern is also divided into bitblocks 241 . . . 246, with the number of bits per block matching the size of the Plain Text Input of block ciphers 211 . . . 216, i.e. 64 bits in the DES case, comprised for example of 8×8 bit ASCII characters including the ASCII parity bit.

Each transposed bit block except the first 241 is furthermore added to the Cipher Text (CT) output of the preceding block cipher prior to application to the Plain text (PT) input of the succeeding block cipher. The CT output of the last block cipher forms the required check code. The non-linear check code as described above can be computed by any non-linear block-combinatorial algorithm, such as those described in U.S. Pat. Nos. 5,148,480 or 5,091,942, which are hereby incorporated by reference herein.

Another method for creating a non-linear CRC is to compute the CRC over both the Plain Text ICON contents and the institutionally-enciphered version of the plain text which will eventually be stored in a registry. The fraudulent customer can not then predict the effect changes in the plain text will have on the CRC code, as he cannot predict what effect plain text changes will have on the institutionally enciphered pattern.

Using the non-linear check code, it is impossible, other than by impractical laborious trial and error, to work backwards from a desired check code to produce an asset description that will fulfill it, and which simultaneously makes sense. A given plain text message would have to be modified in many, scattered bit positions to make a given change to the CRC. The length of the check code can moreover be increased to whatever size is needed to make random attempts to generate it unproductive.

Figure 7:
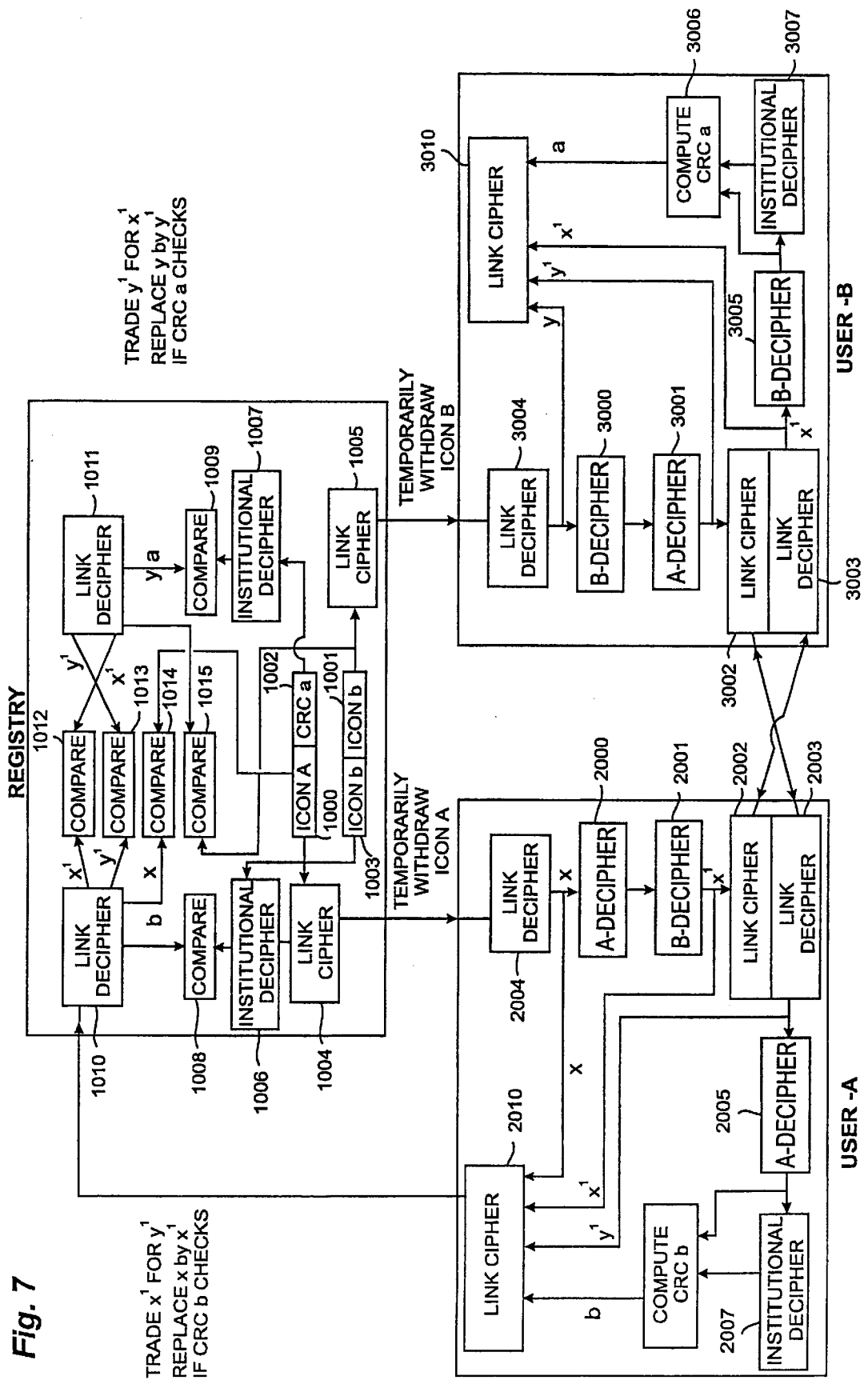
FIG. 7 depicts another example of symmetrically secure electronic communications according to the present invention.

FIG. 7 illustrates in more detail an exemplary implementation of the symmetric security guarantees provided when practicing the invention.

An ICON 1000 is stored in the registry as belonging to customer 31 and is temporarily withdrawn by customer 31 on request. The registry sends the ICON over a secure link encrypted with a link cipher at 1004 and decrypted at block 2004. Customer 31 continues to decrypt ICON bit pattern 'x' using his secret key at block 2000 and then re-encrypts it using customer 32's public key at 2001 to obtain a bit pattern x' that is modified to customer 32's ownership. The modified ICON x' is transmitted to customer 32 using a secure link comprised of link cipher 2002 and corresponding decryption at customer 32 in block 3003. Customer 32, after decryption at block 3003 obtains x' which he proceeds to decipher using his secret key at block 3005 in order to obtain the ICON now covered only by the guaranteeing institution's cipher. The ICON is further decrypted at 3007 using the public key of the guaranteeing institution to reveal the plain text, which is inspected and either approved and accepted by user customer 32 or not. If customer 32 is satisfied with the asset description, he continues by computing the CRC of the ICON using both the plain text and the institutionally enciphered bit pattern, for the reasons explained above. The CRC 'a' is then transmitted to the registry along with the bit pattern x' from which it was derived.

Reciprocally, customer 32 temporarily withdraws ICON 1001 from the registry, which is sent to him enciphered by link protocol 1005 at the registry and then decrypted by him using link deciphering block 2004. Customer 32 then removes his secret cipher at block 3000 to reveal the ICON plain text, which he then encrypts using customer 31's public key at block 3001 in order to offer the asset to customer 31. The ICON thus re-encrypted for customer 31's ownership is transmitted to customer 31 using a secure link comprised of link encryption at block 3002 at customer 32 and link decryption at block 2003 at customer 31. This reveals to customer 31 the bit pattern y' that customer 32 is offering to store in the registry. Customer 31 further deciphers bit pattern y' using his secret key to reveal the ICON covered only by the secret cipher of the guaranteeing institution. The plain text is revealed to customer 31 by further decryption at block 2005 using the guaranteeing institution's public key. Upon inspecting, approving and accepting the plain text asset description, customer 31 proceeds to compute the CRC of the offered ICON over both the plain text and the corresponding institutionally enciphered bit pattern to generate CRC 'b'. CRC 'b' is then transmitted to the registry using link cipher 2010 together with the bit pattern y' offered by customer 32, and also the bit pattern x of the asset customer 31 is trading and the re-enciphered bit pattern x' of that same asset when transferred to customer 32's ownership. Likewise, customer 32 will have transmitted the bit pattern 'y' of ICON customer 32 as presently registered to him and the corresponding bit pattern y', modified to customer 31's ownership. The registry decrypts at block 1010 the bit patterns x' and y' agreed to according to customer 31, and at block 1011 decrypts x' and y' according to customer 32. Comparator 1012 verifies that x' as received from customer 31 agrees with x' according to customer 32, and likewise verifies in comparator 1013 that the customer's respective views on bit pattern y' agree. Comparator 1014 verifies that bit pattern x received from customer 31 agrees with that of ICON A registered to him, and comparator 1009 verifies that CRC 'a' received from customer 32 matches that of ICON 1002, which first has the guaranteeing institution's cipher removed in block 1007. Thus it is verified that the underlying plain text contained within bit patterns x and x' is the same. Reciprocally, comparator 1015 verifies that bit pattern y received from customer 32 matches the bit pattern 1001 of the ICON registered to him, and comparator 1008 verifies that CRC 'b' received from customer 31 matches stored CRC 1003 of ICON customer 32 after being decrypted with the public key of the guaranteeing institution in block 1006. Only when all six comparators produce a match will the registry then execute the trade, which comprises overwriting the ICON's original bit pattern x with the new bit pattern x' and, preferably, simultaneously overwriting the other ICON's original bit pattern y with the modified bit pattern y'.

The preference for simultaneous overwriting of ICONS implies that the contents of the registry's ICON storage memory are invalid at the halfway stage where only one ICON is overwritten and not the other. In a time-shared hardware implementation which can be handling many communications links and trades taking place more or less at the same time, it is important to prevent a new trade that might involve the same ICONs being interposed by a transaction scheduler at the half-complete stage of a previous transaction. This problem may, for example, be circumvented by disabling the registry processor's interrupt mechanism until all ICONs involved in a trade have been overwritten, after which interrupts are re-enabled.

Security according to the present invention depends in part on the concept of the "trusted registry" which can be programmed to selectively execute trades if the safeguards just described with the aid of FIG. 7 are fulfilled. The "trust" is assured by cryptological techniques combined with a proper authorization of registries and the physical security and integrity of their hardware. Thereafter transactions can take place automatically without human intervention. The security depends also partly on the fact that the total number of ICONs in a registry cannot be changed by transactions ordered by customers alone. However, when customer 31 and customer 32 hold their assets in different registries, the registries may, by automatic and encrypted communications links between each other collaborate to implement the above security protocols, effectively behaving as a single registry for the purpose of a particular transaction. Such a collaborative transaction may result in the safekeeping of an ICON being transferred from one registry to another, in which case the number of ICONs in one registry can decrease while the number in another may increase, the total however remaining the same through such a transaction.

Other transactions may involve a change in the number of stored ICONS. For example, when an ICON represents an amount of cash greater than that being traded, the need can arise to split it. Such a split can be arranged by the owner in communication with the issuing bank. The following is an exemplary procedure for organizing a split, many variations of which can be contemplated without departing from the principles and spirit of the invention.

Suppose that the owner temporarily withdraws the ICON to be split from the registry, and after decryption, computes the CRC. The unencrypted ICON is then transmitted to his bank and with the CRC, using a secure link, together with the details of the value of new ICONs he wishes to receive in return, which of course will total to the value of the ICON being replaced. The bank then communicates with the registry using a secure communications protocol to replace the old ICON with more than one new ICON. The increase in the number of ICONs is accepted in this case by the registry as it is ordered by a qualified financial institution. Likewise, two or more ICONs representing the same (or even different) type of asset can be consolidated or "bundled" into a single ICON by a similar transaction. In this way, more complicated trades can be organized using "bundles" of assets. For example, a first user can pay $10000 to a second user to receive a quantity of shares worth $9000 plus $1000 in change.

As an alternative to producing a special ICON to represent "bundled" assets, it is possible to structure the messages which trading parties send to, and receive from, the trusted registries such that more than two ICONs can be traded in the same transaction. FIG. 8 illustrates in tabular form the structure of an exemplary message from a trading party to a registry indicative of a multi-ICON trade.

At line (1), the ID of the first and second trading parties is given. This may include, but is not limited to, any of the following:

public key of respective trading parties;
  social security no. or Organization no. of respective trading parties;
  ID of party issued by the registry (possible valid only for this session); and
  E-mail address or INTERNET port address.

The number of ICONs that the first party expects to transfer to the second party is given, in this example "3", and the number of ICONs expected to be received from the second party is given, "2" in this example.

Then the bit pattern of the first ICON agreed to be transferred is provided, as currently stored in the registry (line 2a), i.e. encrypted with the first party's public key, together with a new version encrypted with the second party's public key (line 2b). There follows the same information for the remaining two ICONs, e.g., at lines 3a–4b.

Then follows the bit pattern of the first of the two ICONs expected to be received from the second party, encrypted with the first party's public key at line 5a. The ID of the guaranteeing institution revealed when inspecting the plain text of the ICON is also indicated.

Associated with each expected ICON bit pattern is a CRC code at line 5a computed by the first party over the plain text content of the ICON which was revealed to him when sent by the second party for inspection, i.e. when the ICON was "offered" by the second party to the first party. Similar information for the second ICON expected to be received completes the message at lines 6a and 6b. The entire message is encrypted using the public key of the registry and the secret key of the sender, and transmitted preferably using an error-tolerant packet protocol which can add checks of its own, performing as many retransmissions of packets corrupted in transmission as necessary to guarantee eventual error-free delivery to the registry.

The second party meanwhile sends a reciprocal message to the registry. The registry matches up the two messages and checks that:

The IDs of the trading parties match in both messages;
  The messages indeed were generated by the parties claiming the indicated IDs, as verified by successful decryption using their respective public keys;
  The number of ICONs expected to be received by one party matches the number traded by the other party, and vice versa;
  The bit pattern of each ICON, as expected to be received by one party matches that provided by the other;
  The CRC of the ICON to be replaced, as stored in the registry, after decryption by the registry using the indicated guaranteeing institution's public key, matches the CRC provided in the message for that ICON.

If the registry detects any anomalies in matching data received from the trading parties, the trade is not executed and warning messages are sent to the trading parties indicating the problem. Repeated failed attempts to execute a transaction can optionally cause the registry to abort the trading session and close the connection, as a protection against random attempts to force through fraudulent transactions by trial and error.

Another type of transaction can involve the transfer of the guaranteeing of virtual money or other assets from one institution to another, while keeping the modified ICON in the same registry. Such a transaction may be ordered by the owner after digital negotiation with the respective institutions, and is then effected by the institutions, private, secure communications between themselves and the registry. Likewise, the user can effect the transfer of ICONs between registries without altering the underlying guaranteeing institution. All such transactions may be automated so that they are executed in a few seconds without human intervention, by applying the teachings herein to guarantee integrity and security.

Having described exemplary security techniques for electronic transactions according to the present invention, the following addresses how everyday financial transactions may be translated to cyberspace. For example, how a bank can pay interest on the value of an ICON, the present ownership of which is not known, and the real funds lie in anonymous escrow, is described. The problem concerns the fact that receipt of interest on deposits, and similarly dividends on shares, is likely to remain a taxable event—but taxable to whom?

One solution involves indicating in the description of an ICON the interest rate payable on the deposit it represents, and the date from which interest is calculated by a Simple Interest formula. The bank can either accumulate interest in the same escrow account, net of withholding tax if so regulated, or can make a provision for the accrued gross interest it is liable to pay on demand.

The current owner of the ICON can make a digital application to the bank to consolidate accrued interest, or to issue a separate ICON for the interest. In this way, the owner, if diligent in regularly requesting consolidation of interest, can ensure that interest is reinvested thus obtaining the benefit of Compound Interest. Moreover, a potential recipient of an ICON can, from inspecting the plain text description of a deposit, verify the amount of accrued interest that will transfer to him upon accepting the ICON in a trade and must allow for any potential tax due. Such calculations can be performed automatically by a suitable trading program running on his personal computer, in order to obviate the need for manual calculations during otherwise fast, automatic trading.

Where interest net of withholding tax is accrued, yet another form of ICON can be issued by the bank indicating the amount of withholding tax paid. Indeed ICONs can be created for any form of transferrable tax credit (such as withholding tax paid) or tax liability (such as unpaid real estate tax on a property).

Dividends on obligations and shareholdings, like interest, are preferably paid into escrow to avoid the need to know the identity of the current owner. Such payments may have to be made net of-withholding tax, or alternatively are received by the institution and a provision made by the institution for a corresponding amount.

The onus is on the current owner of the ICON deposited in a registry to send a digital message to the institution holding the real, underlying assets, requesting payment of any accrued interest or dividend to be made. The payment can optionally be received by the owner in the form of another electronically tradeable ICON, lodged by the paying institution in a registry specified by the payee in the secure manner described above.

When using the present invention, it is also possible to advertise assets for sale or exchange, on a bulletin board for example. Such a bulletin board displays brief descriptions of goods or assets for sale or wanted and the asking or offered price, thus constituting a cyberexchange. Persons wishing to inspect an asset further can contact an indicated E-mail address and correspond either with the person concerned, or, if the asking or offered price is being met by the asset offered in exchange, the trade can in principle be executed automatically by suitable software on a personal computer, which inspects assets offered and confirms their acceptability and the acceptability of the guaranteeing institution.

A trusted registry according to the invention is housed in a physically secure area, is guaranteed to perform operations only within the limits of its security procedures and furthermore should comprise sufficient hardware redundancy to operate with reliability and ability to recover from errors or failures, including perhaps the use of back-up power supplies. A trusted registry should also include a billing system for billing customers for storage of ICONs and for executing trades, which consumes processing resources.

These are exactly the characteristics that a modem digital telephone exchange, such as the Ericsson AXE switch, possess. These switches exist all over the world and are used for local exchanges, trunk exchanges and mobile phone switching centers. Such PSTN exchanges could be equipped with software upgrades that would implement the function of the secure, trusted registry envisaged in this invention.

Modern digital mobile phones conforming to the European GSM or U.S. PCS1900 standards, for example, use smart cards that hold secret subscriber communications keys which cannot be accessed outside of the phone. They also contain an amount of read/write memory for holding often-used telephone numbers and suchlike. These smart cards can be adapted to store and dispense enciphered virtual cash according to the invention. The smart cards are removable from the phones and may be installed in other phones or other devices, such as a PC equipped with a suitable interface. The same smart card may contain a subscriber's public/private key pair used for securing transactions performed either wirelessly over a cellular phone network, for example, or over the Internet. By removing a smart card, the subscriber renders the terminal "safe" in that no other person may then use it to masquerade as the subscriber. The smart card may thus receive wireless downloads of virtual cash via a digital cellular phone call, or may be downloaded when plugged into the home PC. The smart card, via the portable cellular phone, may also dispense virtual cash to a Point-of-Sale terminal, by for example blinking an LED at the POS laser scanner's wand, the light being modulated with bits or bar code at a rate matching that expected by the POS terminal. The cellular phone may also be equipped with a bar-code scanner to read newspaper discount coupons into memory, or may use its microphone to listen to TV ads where audio modem signal bursts can be broadcast to disseminate digital discount coupons, the phone's digital signal processing then decoding such modem signal bursts and storing the digital coupon in memory in the smart card for eventual use at a retail store in electronic communication with a POS terminal.

It has thus been disclosed and described above how a new type of electronic commerce can be accommodated in cyberspace, having the advantages of speed, reduced execution costs through lack of manual intervention, and inventive use of public key encryption techniques to secure trades in both directions, which is an advance over prior art methods which sought only to guarantee payment to the seller, i.e. one direction of trade only. The inventive reciprocal security guarantees provided by the invention allow the wares or assets being sold to be digitally inspected by the buyer prior to purchase to verify that an institution he trusts is standing behind the claimed value, as well as allowing the seller digitally to inspect the wherewithal being offered by the buyer in exchange.

Many variations and applications of the invention can be devised by persons skilled in the art of encryption and financial systems, which variations fall within the scope and spirit of the invention as described by the following claims.

I claim:

1. A method for electronic communication between a first and second party comprising the steps of:

retrieving, from a database, a doubly-encrypted record;

decrypting, by said first party, said doubly encrypted record using said first party's secret key to generate a singly encrypted record;

re-encrypting, by said first party, said singly encrypted record using said second party's public key;

transmitting said re-encrypted record to said second party;

decrypting, by said second party, said re-encrypted record using said second party's secret key to generate said singly encrypted record; and decrypting, by said second party, said singly encrypted record using a third party's public key.

2. The method of claim 1, wherein said step of transmitting further comprises the step of:

transmitting said re-encrypted record over an air interface.

3. The method of claim 1, wherein said third party is a guaranteeing institution.

4. An apparatus comprising:

a memory device which stores doubly encrypted bit patterns associated with monetary denominations; and a device for for receiving said doubly encrypted bit patterns over a communications channel and for storing said doubly encrypted bit patterns in said memory device, wherein said communications channel optionally employs a third communications encryption, and said device deciphers said third communications encryption to obtain said doubly encrypted bit patterns, and wherein said doubly encrypted bit patterns are encrypted once using a first party's secret key and once using a public key associated with said memory device.

5. The apparatus of claim 4, wherein said receiving/storing device and memory device are housed within a card.

6. The apparatus of claim 4, wherein said receiving/storing device and memory device are housed within a mobile phone.

7. A method for electronically transferring money between an electronic wallet and a point-of-sale terminal comprising the steps of:

storing, in said electronic wallet, doubly encrypted bit patterns representing said money;

decrypting, in said electronic wallet, at least one of said doubly encrypted bit patterns to generate at least one singly encrypted bit pattern;

re-encrypting, in said electronic wallet, said at least one singly encrypted bit pattern using a public key of said point-of-sale terminal; and electronically transferring said at least one re-encrypted bit pattern from said electronic wallet to said point-of-sale terminal.

8. The method of claim 7, wherein said step of storing further comprises the steps of:

encrypting said bit patterns using a secret key of a guaranteeing institution; and encrypting said bit patterns using a public key of said electronic wallet to generate said doubly encrypted bit patterns.

9. The method of claim 7, wherein said step of decrypting further comprises the step of:

decrypting said at least one of said doubly encrypted bit patterns using a secret key of said electronic wallet.

10. The method of claim 7, wherein said electronic wallet is a smart card.

11. The method of claim 7, wherein said electronic wallet is a mobile phone.

12. The method of claim 7, further comprising the step of:

transmitting, from said point-of-sale terminal to said electronic wallet, said public key of said point-of-sale terminal.

13. The method of claim 7, further comprising the step of:

retrieving, from a memory device within said electronic wallet, said public key of said point-of-sale terminal.

14. A method for registering a bit pattern representative of an asset comprising the steps of:

generating a description of said asset;

encrypting said description using an institution's secret key to create a single encrypted description;

encrypting said single encrypted description using an owner of said asset's public key to create said bit pattern;

transmitting said bit pattern to a registry;

decrypting said bit pattern using said institution's public key to yield said single encrypted description; and authenticating said single encrypted description.

15. The method of claim 14, wherein said step of authenticating further comprises the step of:

performing a cyclic redundancy check on said single encrypted description after said decrypting step.

16. The method of claim 14, wherein said step of transmitting further comprises the step of:

transmitting an identity of said institution along with said bit pattern.

17. The method of claim 16, wherein said step of decrypting further comprises the step of:

retrieving, at said registry, said institution's public key using said transmitted identity.

18. A method for trading electronic representations of assets comprising the steps of:

withdrawing, by a first party, from a first registry a first electronic representation of a first asset;

marking, by said first registry, said first electronic representation of said first asset as unavailable;

decrypting, by said first party, said first electronic representation of said first asset using said first party's secret key;

re-encrypting, by said first party, said first electronic representation of said first asset using a second party's public key; and transmitting said first electronic representation of said first asset to said second party.

19. The method of claim 18, further comprising the steps of:

decrypting, by said second party, said first electronic representation of said first asset using said second party's secret key;

decrypting, by said second party, said first electronic representation of said first asset using a first guaranteeing institution's public key; and reviewing a description of said first electronic representation of said first asset.

20. The method of claim 19, further comprising the steps of:

withdrawing, by said second party, from a second registry a second electronic representation of a second asset;

marking, by said second registry, said second electronic representation of said second asset as unavailable;

decrypting, by said second party, said second electronic representation of said second asset using said second party's secret key;

re-encrypting, by said second party, said second electronic representation of said second asset using said first party's public key; and transmitting said second electronic representation of said second asset to said first party.

21. The method of claim 20, further comprising the steps of:

decrypting, by said first party, said second electronic representation of said second asset using said first party's secret key;

decrypting, by said first party, said second electronic representation of said second asset using a second guaranteeing institution's public key; and reviewing a description of said second electronic representation of said second asset.

22. The method of claim 21, further comprising the steps of:

transmitting, by said first party to one of said first and second registries, said withdrawn version of said first electronic representation of said first asset, said first electronic representation of said first asset re-encrypted with said second party's public key and a bit pattern expected in exchange from said second party; and transmitting, by said second party to a same one of said first and second registries, said withdrawn version of said second electronic representation of said second asset, said second electronic representation of said second asset re-encrypted with said first party's public key and a bit pattern expected in exchange from said first party.

23. The method of claim 22, further comprising the steps of:

comparing said bit pattern expected in exchange from said second party with said withdrawn version of said second electronic representation of said second asset;

comparing said bit pattern expected in exchange from said first party with said withdrawn version of said first electronic representation of said first asset; and trading if both of said comparing steps result in a match by deleting said marked first and second electronic representations of said first and second assets in said first and second registries, respectively, and replacing same with said first electronic representation of said first asset re-encrypted with said second party's public key and said second electronic representation of said second asset, said second electronic representation of said second asset re-encrypted with said first party's public key, respectively.

24. The method of claim 23, further comprising the step of:

performing a cyclic redundancy check on said first electronic representation of said first asset.

25. The method of claim 23, further comprising the step of:

performing a cyclic redundancy check on said second electronic representation of said second asset.

26. The method of claim 18, wherein said first and second registries comprise a same database.

27. The method of claim 21, wherein said first and second guaranteeing institution are a same guaranteeing institution.

28. The method of claim 14, further comprising the steps of:

generating a cyclic redundancy check code using said description;

including said cyclic redundancy check code as part of said bit pattern transmitted to said registry.

29. The method of claim 28, wherein said step of generating a cyclic redundancy check code further comprises the step of:

using a nonlinear code computation to generate said cyclic redundancy check code.

30. A method of providing secure electronic trades between a first party agreeing to trade a first asset and a second party agreeing to trade a second asset in return for said first asset comprising the steps of:

communicating, by said first party, with a first financial institution to obtain a first bit pattern describing said first asset, said first bit pattern being encrypted using a first cipher key known only to said first institution and further encrypted using a second cipher key supplied by said first party;

communicating, by said second party, with a second financial institution to obtain a second bit pattern describing said second asset, said second bit pattern being encrypted using a third cipher key known only to said second institution and further encrypted using a fourth cipher key supplied by said second party;

deciphering, by said first party, said first bit pattern using a cipher key inverse of said second cipher key known only to said first party and re-encrypting said first bit pattern using said fourth cipher key;

deciphering, by said second party, said first bit pattern using a cipher key inverse of said fourth cipher key known only to said second party and re-encrypting said second bit pattern using said second cipher key; and exchanging, by electronic transmission between said first and second parties, said re-encrypted first and second bit patterns.

31. The method of claim 30 in which said first and second financial institutions are the same financial institution.

32. The method of claim 30 in which said first and third cipher keys are the same and their respective inverse keys are also the same.

33. The method of claim 30 in which at least one of said cipher keys comprises a first and second number, the first number being a product of 'n' large primes P1,P2 . . . P(n) and the second number being a factor of the value 1+(P1-1)(P2-1) . . . (P(n)–1), where 'n' is equal to at least two.

34. The method of claim 14, wherein said registry is located in a telecommunication switch.

35. An apparatus comprising:

a memory device for storing doubly encrypted bit patterns associated with monetary denominations; and a device for deciphering a first doubly encrypted bit pattern associated with a first monetary denomination using a deciphering key to produce a once deciphered bit pattern, immediately re-encyphering said once deciphered bit pattern using a ciphering key to produce a second doubly encrypted bit pattern, and transmitting said second doubly encrypted bit pattern, wherein said second doubly encrypted bit pattern is associated with the first monetary denomination, and wherein the device removes from memory the once deciphered bit pattern after said re-encyphering and said transmitting.

* * * * *

UNITED STATES PATENT AND TRADEMARK OFFICE
CERTIFICATE OF CORRECTION

PATENT NO.    : 6,311,171 B1
DATED         : October 30, 2001
INVENTOR(S)   : Paul W. Dent It is certified that error appears in the above-identified patent and that said Letters Patent is hereby corrected as shown below:

Column 18,
Line 49, please delete "for", second occurrence.

Signed and Sealed this

Seventeenth Day of December, 2002

JAMES E. ROGAN
*Director of the United States Patent and Trademark Office*